July 14, 1925.

H. CLEMENT

OPTICAL DIAGNOSTIC INSTRUMENT

Filed May 2, 1922

1,545,484

INVENTOR
Hans Clement
BY
Stockbridge & Borst
ATTORNEYS

Patented July 14, 1925.

1,545,484

UNITED STATES PATENT OFFICE.

HANS CLEMENT, OF NEW YORK, N. Y., ASSIGNOR TO GENERAL OPTICAL COMPANY, INC., A CORPORATION OF NEW YORK.

OPTICAL DIAGNOSTIC INSTRUMENT.

Application filed May 2, 1922. Serial No. 557,870.

*To all whom it may concern:*

Be it known that I, HANS CLEMENT, a citizen of the United States, residing at New York city, in the county of New York and State of New York, have invented certain new and useful Improvements in Optical Diagnostic Instruments, of which the following is a full, clear, and exact description.

My invention relates to optical diagonostic instruments such as skiascopes, retinoscopes and ophthalmoscopes, and particularly to the miniature incandescent electric lamp which serves as the source of illumination in such instruments.

The efficacy of these diagnostic instruments depends in large measure upon the character of the spot of light which is projected by them to assist in examining the patients' eyes. The principal object of my invention is to improve this spot of light so as to eliminate or reduce to a negligible amount any color bands therein, and also to render more uniform the less brilliantly illuminated area surrounding the bright center.

The nature of my improvement will be clearly understood from the following particular description. I shall now describe my invention with the aid of the accompanying drawings and shall thereafter point out my invention in claims.

Figure 1:
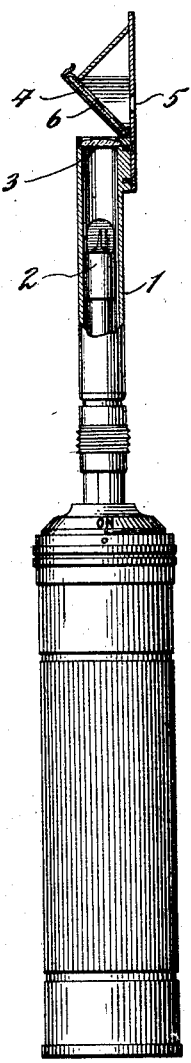
Fig. 1 is an elevation, partly in section, of a retinoscope embodying my invention.

The retinoscope selected for illustration in Fig. 1 is similar to that which forms the subject matter of my Patent No. 1,281,136, granted on October 8, 1918, although manifestly the lamp which will be hereinafter particularly described, can be used with any type of instrument. As is well known, such instruments have an upright tube 1, on the handle, within which is contained the lamp 2, the light from the lamp being concentrated by a condensing lens 3 upon a reflecting mirror 4. This beam of light is thrown by the examiner into the eye of the patient in alignment with the sight openings 5 and 6. With this particular type of instrument the oculist is enabled to observe the condition of the retina since the projected beam of light illuminates the retina. A healthy retina is of a pinkish color, and the oculist is able to detect unhealthy conditions in the retina by differences of color. It is, therefore, extremely desirable that the projected light should be as near white as possible in order that there may not be a false color appearance of the retina. It is also desirable that the area surrounding the central bright spot of the illuminated region be as near uniform in illumination as possible. Therefore it is manifest that if bright bands occur in this surrounding area such bands will cause confusion and interfere with the examination of the central brightly illuminated spot.

Figure 4:
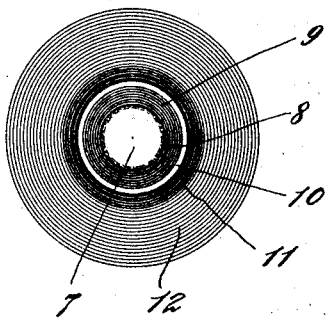
Fig. 4 is a representation of a spot projected by the instrument when equipped with the usual lamp.

It is a well known that much difficulty is experienced from this cause with the miniature lamps heretofore used. There generally appears, for instance, a very prominent band of yellow and red light around the edge of the brightly illuminated central spot. Also surrounding this spot there usually appears a narrow bright band. This is illustrated in Fig. 4, where the reference character 7 designates the usual central bright spot around the edge of which appears the color band 8. Immediately surrounding this central bright spot will usually be found a relatively dark band 9, then an extremely bright band 10, then another dark band 11, and finally a relatively wide, somewhat lighter band 12.

Figure 2:
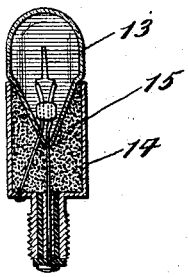
Fig. 2 is an enlarged sectional elevation of my improved lamp for use therein.

In Fig. 2 is illustrated in section the construction of my improved miniature lamps. A glass bulb 13, is secured in a metallic base 14, by cement 15, the terminals to which the filament is connected leading out to the base and to a central insulated contact point in the usual manner.

Figure 3:
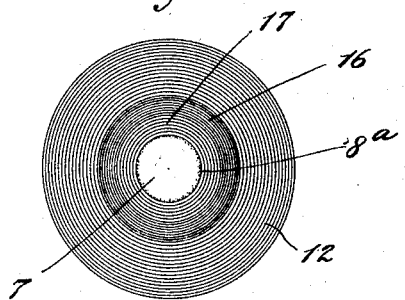
Fig. 3 is a representation of the spot of light projected by the instrument with my improved lamp.

The cement 15 heretofore employed in these lamps has been white or of some color which is only slightly absorptive to light rays. I have found that the irregularity in the bands 9, 10, 11 and 12, surrounding the central spot 7, as well as the prominence of the color bands 8, are due to this white cement. In accordance with my invention, I make the cement 15 black or highly absorptive to light rays, and I have found that when the lamps are mounted with black cement the spot of light is substantially as illustrated in Fig. 3 in which the color band 8ª, surrounding the bright central spot 7, is very faint and that the reflection band surrounding the central bright spot 7 is substantially uniform from its inner to its outer edge. The outer relatively white lighter band 12, is substantially the same as that in the spot of light projected from the usual lamp mounted with white cement, but the bright band 10 is entirely eliminated, and there is only a narrow, moderately dark band 16 which appears between the outer lighter band 12 and an inner lighter band 17, immediately surrounding the bright central spot 7.

I have further found that even the faint colored band 8ª, may be entirely eliminated by the use of a blue glass for the bulb 13, when used in conjunction with the black cement 15. Although a blue bulb gives a somewhat lower intensity of light, this is not detrimental to the efficiency of the instrument. It is to be understood that by blue, I did not intend to limit myself to the pure primary color, but other colors may be used in which blue is a component.

I claim:

1. In a diagnostic instrument, the combination of a condensing lens, an angularly disposed reflecting surface positioned to have light focused thereon by the lens, and a source of light located with respect to the lens to have its light rays focused on the reflecting surface and comprising a miniature incandescent electric lamp bulb, a metallic base for the bulb, and a cement for securing the bulb to the base which is highly absorptive to light rays.

2. In a diagnostic instrument, the combination of a condensing lens, an angularly disposed reflecting surface positioned to have light focused thereon by the lens, and a source of light located with respect to the lens to have its light rays focused on the reflecting surface and comprising a blue glass miniature incandescent electric lamp bulb, a metallic base for the bulb, and black cement for securing the bulb to the base.

In witness whereof, I hereunto subscribe my signature.

HANS CLEMENT.